United States Patent

Ozaki

(10) Patent No.: US 6,615,097 B2
(45) Date of Patent: Sep. 2, 2003

(54) PRODUCTION MANAGEMENT SYSTEM

(75) Inventor: Hiroji Ozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 211 days.

(21) Appl. No.: 09/764,131

(22) Filed: Jan. 19, 2001

(65) Prior Publication Data

US 2002/0032495 A1 Mar. 14, 2002

(30) Foreign Application Priority Data

Jul. 12, 2000 (JP) ........................... 2000-211908

(51) Int. Cl.⁷ .................. G06F 19/00; G06F 9/45
(52) U.S. Cl. .............. 700/121; 700/100; 700/103; 703/22
(58) Field of Search ............... 700/45, 73, 97, 700/99, 100, 102, 103, 121; 703/6, 17, 22

(56) References Cited

U.S. PATENT DOCUMENTS

| | | | | |
|---|---|---|---|---|
| 4,796,194 A | * | 1/1989 | Atherton | 700/103 |
| 4,866,628 A | * | 9/1989 | Natarajan | 700/102 |
| 4,887,218 A | * | 12/1989 | Natarajan | 700/102 |
| 5,402,349 A | * | 3/1995 | Fujita et al. | 700/97 |
| 5,444,632 A | * | 8/1995 | Kline et al. | 700/100 |
| 5,493,501 A | * | 2/1996 | Kondo | 700/95 |
| 5,691,895 A | * | 11/1997 | Kurtzberg et al. | 700/29 |
| 5,841,660 A | * | 11/1998 | Robinson et al. | 700/115 |
| 5,966,312 A | * | 10/1999 | Chen | 703/6 |
| 6,128,588 A | * | 10/2000 | Chacon | 703/6 |
| 6,470,231 B1 | * | 10/2002 | Yang et al. | 700/121 |
| 2001/0049595 A1 | * | 12/2001 | Plumer et al. | 703/22 |

FOREIGN PATENT DOCUMENTS

| | | |
|---|---|---|
| JP | 7-40206 | 2/1995 |
| JP | 8-2648 | 1/1996 |
| JP | 8-76813 | 3/1996 |
| JP | 8-192906 | 7/1996 |
| JP | 9-17837 | 1/1997 |
| JP | 9-50466 | 2/1997 |
| JP | 10-55393 | 2/1998 |
| JP | 10-135096 | 5/1998 |

* cited by examiner

Primary Examiner—Leo Picard
Assistant Examiner—Elliott Frank
(74) Attorney, Agent, or Firm—McDermott, Will & Emery

(57) ABSTRACT

A production management system has a plurality of pieces of production apparatus, a production controller connected online to the production apparatus, and a simulator. The simulator performs a simulation of physical distribution for a specified period of time through use of a simulation parameter, apparatus information, and process information, which are acquired from the production controller. A re-simulation of physical distribution is performed while taking, as parameters for optimizing physical distribution, time-series data pertaining to the availability factor of each apparatus and the load factor of each apparatus obtained as a result of the simulation, as well as the start and termination times of an event which is to arise in the period of a simulation. A dispatch rule set for each apparatus or a group of pieces of apparatus having a single function is dynamically changed, thus feeding back the change to control of real physical distribution.

4 Claims, 6 Drawing Sheets

PRIOR ART

PRODUCTION MANAGEMENT SYSTEM

BACKGROUND OF THE INVENTION

1. Field of the Invention

The present invention relates to a production management system, and more particularly, to a production management system for carrying out efficient physical circulation and multi-product variable production management on a semiconductor manufacture and development line.

2. Background Art

Various production management systems concerning manufacture of a semiconductor have hitherto been put forward.

For instance, Japanese Patent Application Laid-Open No. 2648/1996 describes a simulator for predictively controlling the volume of material to be physically distributed and having the function of checking the real situation against the result of simulation, as well as a re-simulation function. Japanese Patent Application Laid-Open Nos. 192906/1996 and 296067/1995 describe a method for predicting and optimizing the amount of material to be physically distributed, by means of applying the result of simulation of physical circulation online. Japanese Patent Application Laid-Open Nos. 76813/1996, 41114/1995, and 314107/1994 describe simulation (or modeling) techniques based on a network model. Japanese Patent Application Laid-Open No. 50466/1997 describes a method for simulating routes for physical circulation. Japanese Patent Application Laid-Open No. 17837/1997 describes a method for optimizing batch processing and improving the efficiency of processing, such as prediction of identical processing, by combination of a track record computer and a physical-circulation simulator. Japanese Patent Application Laid-Open No. 55393/1998 describes a method of improving efficiency of processing, such as prediction of identical processing, for preventing set-up and replacement of facilities on a multi-product production line, by means of optimizing batch processing through a lot integration simulation based on process information. Further, there is proposed a method for performing a simulation through use of parameters, such as material stock information and a shipment schedule.

FIG. 6 is a chart showing an example of a conventional production management system.

In the drawing, LAN designates a local area network illustrated by a single wire; reference numeral 1 designates a production line having a plurality of pieces of production apparatus (Apparatus #A, Apparatus #B, . . . Apparatus #XX); and 2 designates a production controller connected online to the production line 1 by way of the LAN. A designation parameter a dispatch rule, a simulation period, or the like) and an automatically-extracted parameter (a processing time, of single wafer processing and batch processing, for each recipe, or an equipment path for each device or process) are assigned to the production controller 2. The production controller 2 manages data pertaining to all manufacturing apparatus disposed in and all production lots to be produced on a production line.

Reference numeral 3 designates a simulator and database and is connected to the LAN. The simulator 3 accesses the production controller 2 and extracts from the same track record data such as processing times or previously-prepared data. Through use of the thus-extracted data, the simulator 3 performs simulation or re-simulation. Reference numerals 5A to 5E designate office terminals connected to the LAN.

The terminals 5A to 5E control handling of data and the operation of the simulator 3.

The pieces of manufacturing apparatus #A, #B, . . . #XX disposed on the production line 1 are responsible for respective steps of the process for manufacturing, for example, a semiconductor device. In the drawing, predetermined material is supplied to the apparatus #B as a lot. After having been processed by the apparatus #B, the material is returned to the apparatus #A, as indicated by an arrow. The material is then processed by the apparatus #A. Similarly, the material is supplied to apparatus #C, #D, and #XX. In each apparatus, the material is processed.

An arrow extending from the apparatus #XX to the apparatus #A indicates a case where, after having been processed by the apparatus #XX, material is sent to the process of apparatus #A, where the material is processed again. In connection with such a production line 1, the production controller 2 performs forward scheduling or backward scheduling of events according to a desired physical distribution rule (a dispatch rule) through use of track record data or previously-prepared data, such as a processing time, in real time or off line, in consideration of a factor responsible for deteriorating the efficiency of batch processing or set-up/replacement operation. The production controller 2 controls and causes the simulator 3 to perform simulation or re-simulation, thus predicting the volume of material to be physically distributed.

The conventional production management system has the foregoing configuration and is suitable for use with a line on which is delivered a lot for which processing time and flow have been predetermined; that is, a single-product mass production line. However, the production management system cannot cope with physical distribution parameters which vary with time, on a variable multi-product production line; particularly, a line for simultaneously effecting manufacture and development of a product. For this reason, the conventional production management system is not suitable for use with a development lot for which a process flow has not been determined or with a development line in which there frequently arises a change in the process flow of an introduced lot, addition of a process flow, or an interruption by a process requiring an unknown amount of time to perform processing such as a reproduction, testing, or inspection operation.

Customization of a commercially-available general-purpose simulator involves consumption of much time, and in many cases a customized simulator is not applicable.

The present invention has been conceived to solve the foregoing drawbacks of the conventional method and system. The present invention is aimed at achieving an optimal result of physical distribution by means of dynamically changing a dispatch rule (a physical distribution rule) in a case where a failure is predicted to arise, in consideration of a time-series predicted value pertaining to an in-process load as well as a predicted value pertaining to the volume of material to be physically distributed (i.e., a load factor of a processing apparatus).

The present invention is also aimed at eliminating a problem of a conventional simulator failing to exhibit an optimal solution, by means of improving the accuracy of simulation through the steps of: capturing all data pertaining to a disturbance factor such as a scheduled time for starting and terminating an inspection, a scheduled time for starting and terminating a test, and a scheduled time for starting and terminating maintenance of a production apparatus; and immediately replacing data with new data and performing re-simulation in a case where the data are modified.

The present invention is aimed at providing a production management system which performs at least one simulation operation and utilizes, for improving the accuracy of a simulation operation, the following items as parameters of a re-simulation operation while using data pertaining to the simulation result as initial data; namely, (1) a load factor of a processing apparatus and time-series test data pertaining to an in-process load factor;

(2) disturbance factors, such as a test, an inspection, reproduction, a change in process flow, introduction of a new lot, or maintenance of a processing apparatus; and (3) a dynamic change in a dispatch rule, thereby implementing an optimal set-up function including scheduling of dynamic physical distribution.

SUMMARY OF THE INVENTION

According to one aspect of the present invention, a production management system comprises a production controller connected online to a plurality of pieces of production apparatus, or a data processing apparatus connected online to an off line management apparatus having a production management function and a simulator.

The simulator performs a simulation of physical distribution for a specified period of time through use of a simulation parameter, apparatus information, and process information, which are acquired from the production controller or the offline management apparatus. The simulator further performs a re-simulation of physical distribution while taking, as parameters for optimizing physical distribution, time-series data pertaining to the availability factor of each apparatus and the load factor of each apparatus obtained as a result of the previous simulation, as well as the start and termination times of an event which is to arise in the period of a simulation. Then, the production controller dynamically changes a dispatch rule set for each apparatus or a group of pieces of apparatus having a same function, thus feeds back the change to control of real physical distribution.

In another aspect of the present invention, in the production management system, the re-simulation of physical distribution is performed automatically or at a predetermined timing while occurrence of an event is used as a trigger, and the result of the simulation is retained in the simulator or an external computer connected thereto and can be transmitted.

In another aspect of the present invention, in the production management system, reporting of occurrence of the event is registered or changed while start and termination times or scheduled start and termination times output from a portable terminal, the production controller or the offline management apparatus, or the simulator are taken as parameters. The registered report is registered in the simulator or an external computer connected thereto. A re-simulation of physical distribution is performed automatically or at a predetermined timing after completion of registration of the report, and the result of the re-simulation is immediately transmitted from the simulator or from the external computer connected thereto.

Other features and advantages of the invention will be apparent from the following description taken in connection with the accompanying drawings.

DETAILED DESCRIPTION OF THE PREFERRED EMBODIMENTS

First Embodiment

A first embodiment of the present invention will be described hereinbelow.

Figure 1:
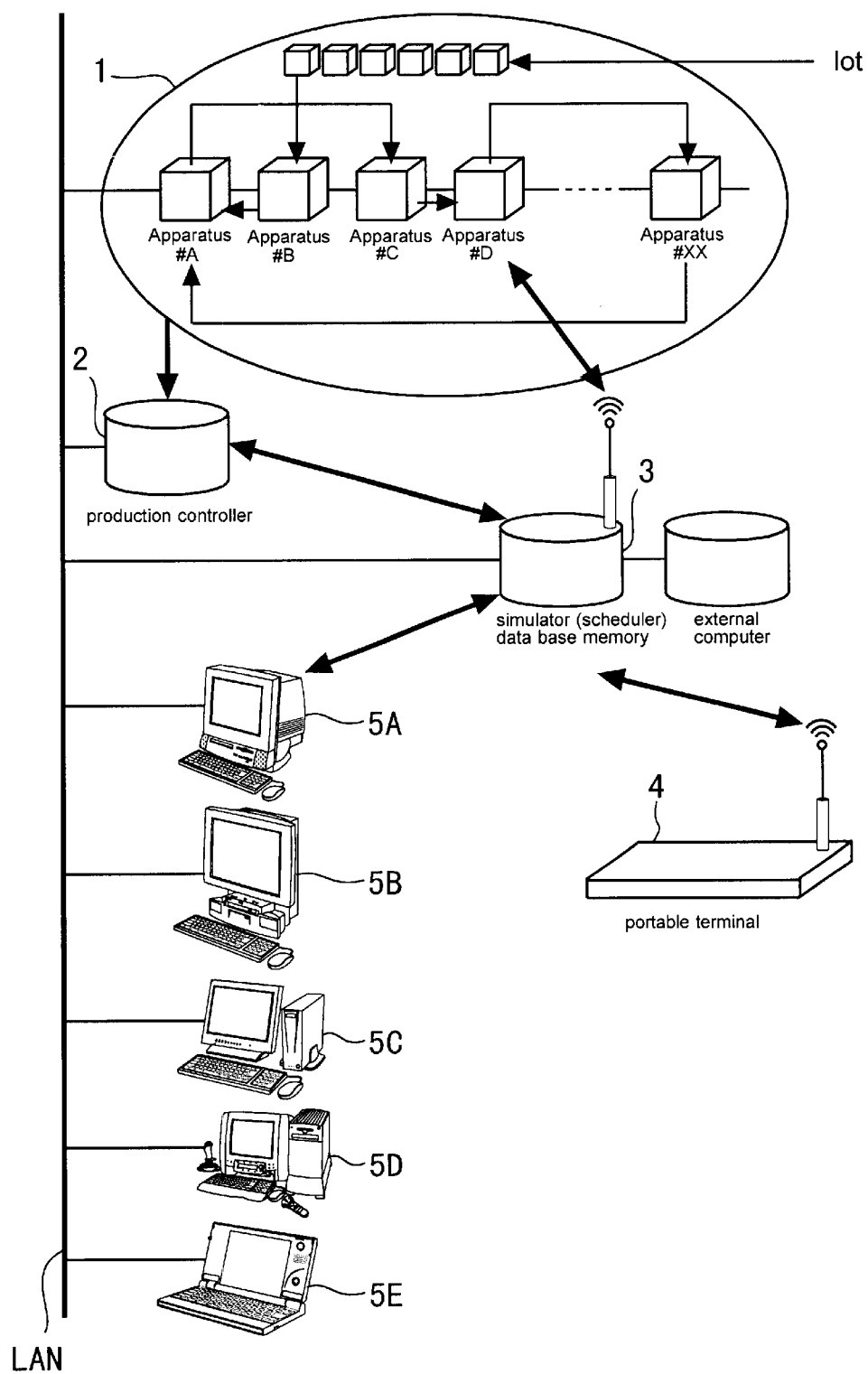
FIG. 1 is a chart showing the configuration of a production management system according to a first embodiment of the present invention.
Figure 2:
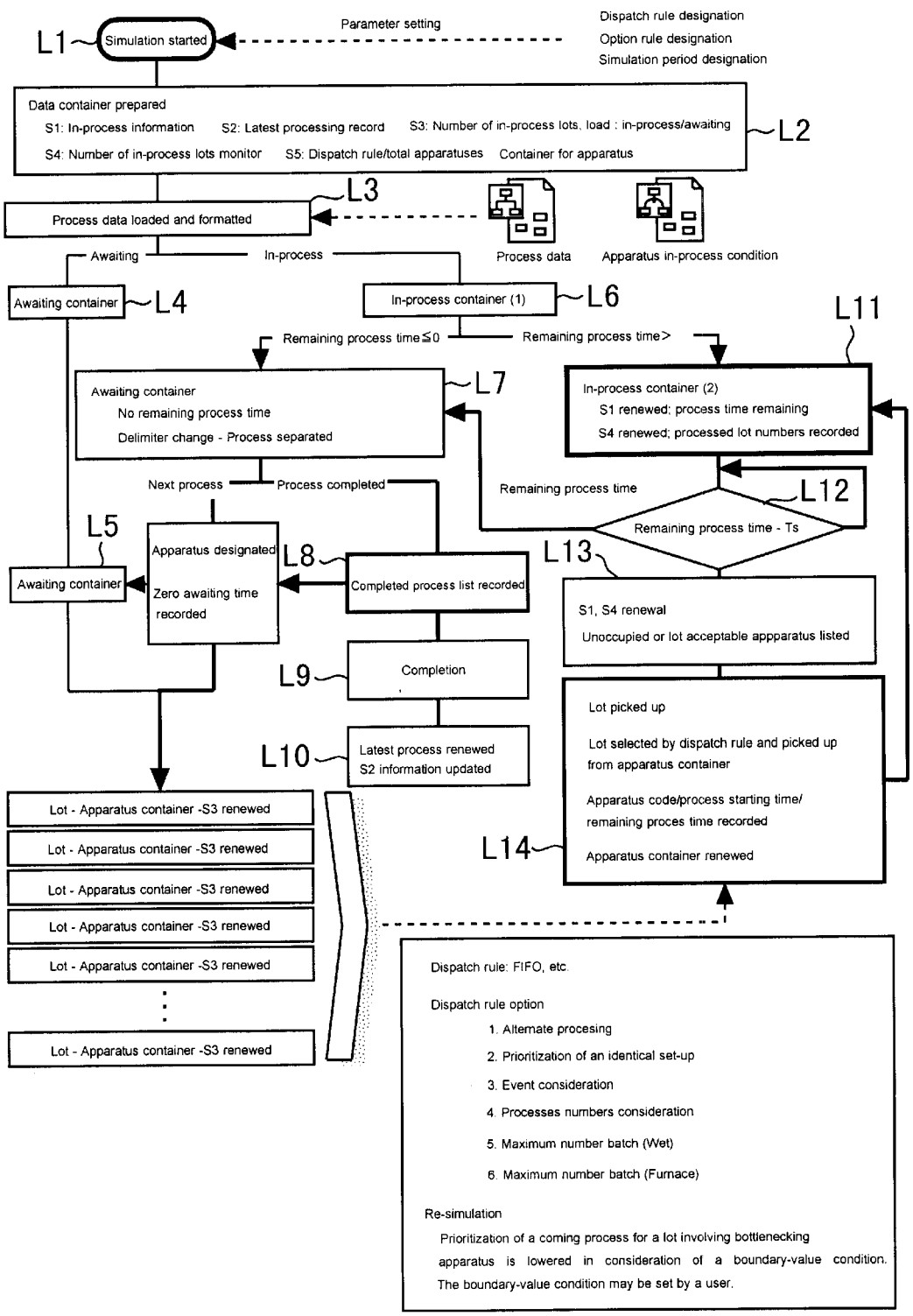
FIG. 2 is a flowchart showing a simulation logic according to the first embodiment.
Figure 3A:
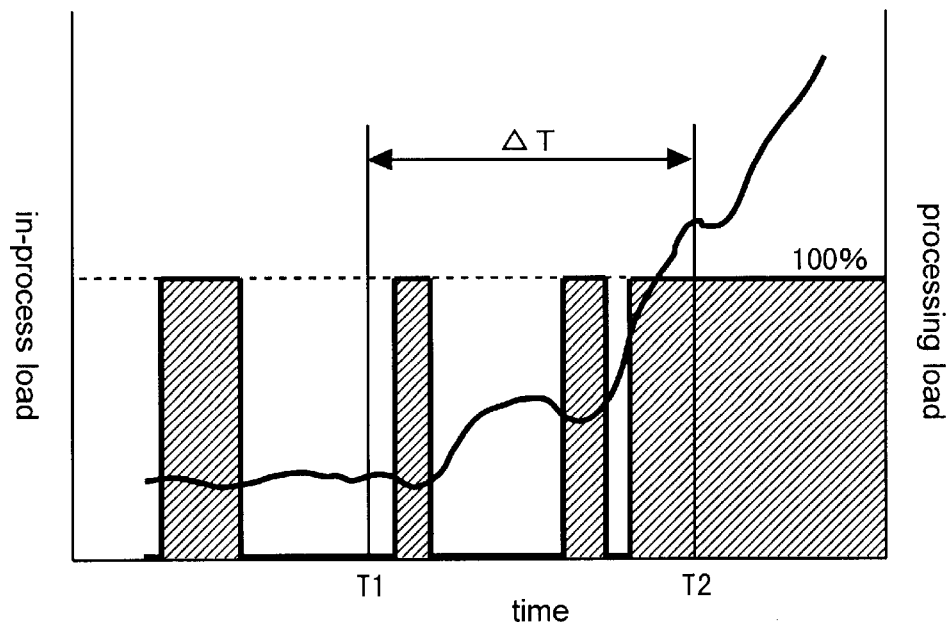
FIGS. 3A and 3B are graphs showing an example algorithm for controlling physical distribution according to the first embodiment.
Figure 3B:
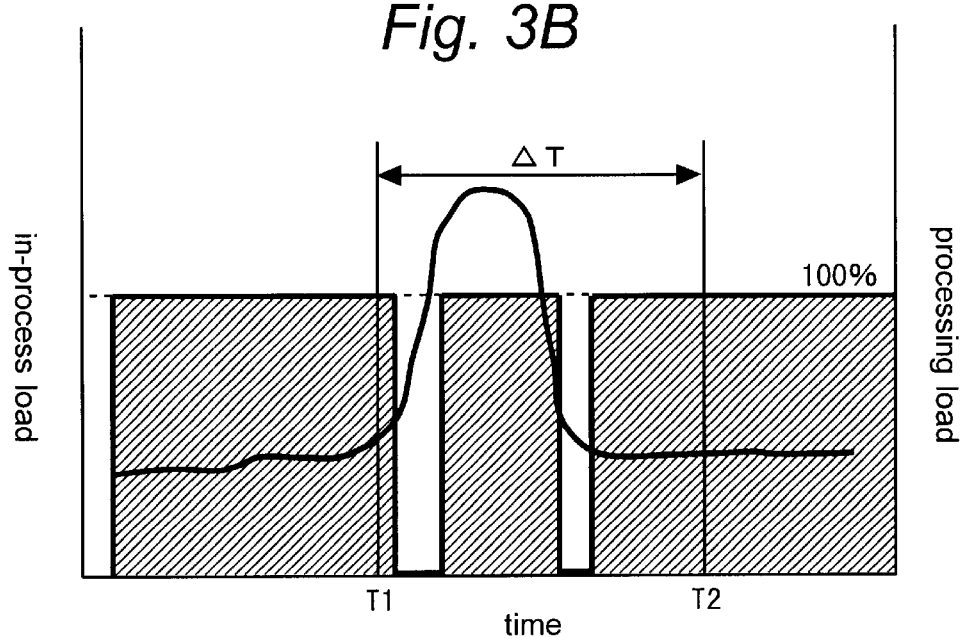

FIG. 1 is a chart showing the configuration of a production management system according to a first embodiment of the present invention. FIG. 2 is a flowchart showing a simulation logic according to the first embodiment; and FIGS. 3A and 3B are graphs showing an example algorithm for controlling physical distribution according to the first embodiment.

The configuration of the production management system will first be described by reference to FIG. 1. In the drawing, LAN designates a local area network illustrated by a single wire; reference numeral 1 designates a production line having a plurality of pieces of production apparatus (Apparatus #A, Apparatus #B, ... Apparatus #XX); and 2 designates a production controller connected online to the production line 1 by way of the LAN. A designation parameter (e.g., a dispatch rule, a simulation period, or the like) and an automatically-extracted parameter (a processing time, of single-wafer processing or batch processing, for each recipe, or an equipment path for each device or process) are assigned to the production controller 2. The production controller 2 manages data pertaining to all manufacturing apparatus disposed in and all production lots to be produced on a production line.

Process data pertaining to a lot to be used comprise parameters; that is, (1) a serial number (assigned with respect to the entire production line); (2) a serial number (assigned with respect to a lot); (3) a lot number; (4) priority; (5) a designated apparatus; (6) alternate apparatus; (7) a recipe; (8) a recipe parameter; (9) an event flag; (10) the number of wafers; (11) the date and time (in second) for introducing a lot; (12) the scheduled date and time (in second) for completing production; (13) the number of effective processes; (14) the number of completed processes; (15) the number of remaining processes; (16) a processing time; (17) an integrated processing time; (18) the date and time for starting production; (19) the date and time for completing operations pertaining to a process; and (20) a change flag.

Of these parameters, (6) an alternate apparatus and (16) a processing time are determined by affixing, to the process, process track record data extracted from the production controller 2 or the production line 1. (19) the date and time for completing operation pertaining to a process is a field for entry of the result of an actual simulation. (9) event flag designates a process whose processing time cannot be clearly ascertained, such as a test or a non-routine inspection. In a case where a lot manager has entered a processing time beforehand or has updated the processing time, the event flag 9 is used for immediately replacing the process data with new data and performing re-simulation.

Reference numeral 3 designates a simulator (scheduler) or an external computer connected to the LAN 2. In the simulator 3, there is established an archival database (DB) for preserving time-series track record data pertaining to a simulation of a load factor and an in-process load factor imposed on a processing apparatus, as well as data pertaining to a scheduled time for starting and terminating an external event. The simulator 3 accesses track record data registered in the production controller 2 and extracts desired data. Subsequently, the simulator 3 performs a simulation of physical distribution and transfers a production sequence to the production controller 2 or the production line 1.

Reference numeral 4 designates a portable terminal. The portable terminal 4 has the function of reporting an event to the simulator 3, the function of instructing performance of a simulation, the function of converting a simulation result from local data (a temporal standby condition) to global data (actual physical distribution), the function of displaying a simulation result, and an inspection function.

Reference numerals 5A to 5E designate office terminals connected to the LAN. The terminals 5A to 5E each have the function of sending a report and instruction to the simulator 3 and the function of controlling the simulator 3, as does the portable terminal 4.

A simulation logic according to the first embodiment will now be described.

The simulation logic shown in FIG. 2 uses line information at an arbitrary time (unfinished process information about an apparatus and a lot) and a simulation parameter as source data. Processing which does not take into consideration a transfer time is taken as an example.

There is illustrated an example in which data pertaining to a lot are formatted as a line of text data and the lot data are transported between containers.

In L1 parameter settings are loaded into the production controller 2, to thereby commence a simulation. In L2, a data container is prepared.

Data required for performing a simulation beginning with a container S comprise:

S1 Information about processes being performed on all lots which are being processed at an arbitrary time Apparatus code, process name, a recipe, and remaining processing time To be renewed at simulation time step Ts S2: Latest processing record Apparatus code, process name, and a recipe The record is updated on a per-apparatus basis when processing pertaining to a certain process is completed.

S3: Apparatus "awaiting" load

Apparatus code, and the number of in-process lots/load factor (%)

Load factor (%) is a value obtained by dividing the integrated time required by an apparatus for performing processing by 24 hours. Contents of a container awaiting processing are updated when the configuration of a lot is changed.

S4: The number of in-process lots/total apparatuses

This information is updated on a per-apparatus basis when processing pertaining to a certain process is completed.

S5: Dispatch rule/total apparatuses

This information is updated by means of setting performed by a user.

In L3, the operating condition of an apparatus including the processing conditions and in-process conditions of an apparatus is loaded into the production controller 2, and there is formatted process data including the condition of processing currently being performed and information about unfinished processing (processing time+information about a path to an apparatus).

Subsequently, a lot awaiting processing (simply called "awaiting lot") and a lot which is being processed (simply called "in-process lot") are distributed. The awaiting lot is transported to an awaiting container L4, and computation pertaining to S3 is performed. The in-process lot is transported to an in-process container L6. The awaiting container L4 enters a standby state. In contrast, the in-process container L6 is classified into a category labeled "processing time remains" and a category labeled "no processing time remains", by means of checking processing time against a processing start time, which are contained in process information. In a case where the in-process container L6 is classified into the category labeled "no processing time remains", the current processing is completed by way of a container L7 awaiting processing (simply called "awaiting container"). Completion of the current processing is registered in a processing record in L8. In L9, a completion time is input. In L10, information concerning S2 is updated. Further, the next processing is transported to a container L5 awaiting an apparatus (simply called "apparatus-awaiting container"). An apparatus awaiting load described in connection with S3 is computed.

In a case where the in-process container L6 is classified into the category labeled "processing time remains", simulation time step Ts is advanced by way of an in-process container L11.

In a case where in L12 a lot having a remaining processing time of less than 0 arises during the course of progress of Ts, the lot is transported to L7, where the lot is processed in the same manner as in the case where the lot is classified into the category labeled "no processing time remains."

When processing of the lot is completed, a completion operation is performed in L13.

In L14, a lot is picked up by reference to S4 (unoccupied condition of an apparatus) according to a dispatch rule defined for each apparatus in S5. The thus-picked-up lot is registered in S1.

Processing pertaining to L11 to L14 is repeated. Picking up of a lot in L14 is performed according to a dispatch rule and an option rule.

Major examples of a dispatch rule and major examples of an option rule will now be described.

(1) Major examples of dispatch rule
    (D1) random sampling, sampling in sequence of delivery, sampling in sequence of precedence, FIFO (first-in first-out) sampling, sampling of maximum wait time, sampling of minimum processing time
    (D2) sampling of minimum load on an apparatus which is to perform processing "n" steps ahead, and sampling of minimum load on an apparatus which is to perform processing "n through r" steps ahead A dispatch selection method is roughly divided into two types; namely, a method comprising the steps of: sorting lots while a certain parameter is taken as a key, and extracting one from the thus-sorted lots (this method is applied to D1); and a method comprising the steps of: performing computation on the basis of a certain parameter, sorting lots while the computation result is taken as a key, and extracting one from the thus-sorted lots (this method is applied to D2).

(D1) The parameters (1) and (19) of the process data are used as keys at the time of sorting of lots.
    (D2) A new parameter is computed from the information described in connection with S3 (i.e., an apparatus awaiting load). Lots are sorted while the new parameter is taken as a key, and a lot involving a small load is extracted. The thus-extracted lot is transported to the in-process container L6.

(2) Major examples of option rule

Parameter (6) of the process data pertaining to an alternate apparatus: a path leading to an apparatus having a track record comparable to the designated apparatus Prioritization of an identical set-up operation: typified by, for example, replacement of an ion source for an ion implanter. In a case where certain processing involves consumption of additional set-up time for reasons of a change in a recipe, if a lot being processed requires the same conditions as those originally required by the certain processing, the lot is selected by neglect of the dispatch rule Consideration given to an event/no consideration given to an event: interrupt information related to a lot and an apparatus Consideration given to the required number of processes/no consideration given to the required number of processes: progress of a lot is or is not stopped in a case where the required number of progress steps of a prioritized lot is satisfied Prioritization of the maximum number of batch processing operations (i.e., the number of lots/the number of wafers): this rule is intended for implementing an option for a "furnace annealer or pretreatment equipment" which enables continuous introduction of lots in a case where lots being processed simultaneously have identical recipes. According to this rule, of lots which are in process, the maximum number of lots which can be grouped and processed together are processed in preference.

As a result of a simulation being performed through use of the foregoing routine, there are obtained a completed processing list a processing record (the name of a lot, a processing apparatus, a processing start time, and a processing termination time), and data pertaining to S3.

The thus-obtained data are grouped according to an apparatus and in chronological order. As a result, there are obtained the following factors of each apparatus during the period of a simulation (or in the course of performance of a simulation):

(A) Processing load factor (computed by dividing an integrated processing time by a simulation period), and (B) In-process load factor (computed by dividing an integrated time required for processing an in-process lot by 24 hours).

Processing schedule data are simultaneously prepared from the processing record for each apparatus. In a case where products are manufactured online, the schedule data are taken as set-up data; that is, a sequence in which the apparatuses pick up a lot. In a case where products are manufactured off line, the schedule data can be utilized as a work procedure manual, so long as the schedule data are visualized for each apparatus.

From the load factors (A) and (B), there is formed information about an apparatus involving a large production load and a large in-process load; that is, a bottlenecking apparatus in assembly.

So long as the user sets a boundary-value condition for determination of a bottlenecking apparatus for each apparatus, the user can re-simulate a point in time when the physical distribution method is to be changed (e.g., simulation of prioritization of processing of a lot which does not involve use of the bottlenecking apparatus).

Even in a case where another apparatus poses a bottleneck in assembly, the user updates settings in the same manner as mentioned previously, thereby finally enabling control of processing such that all required apparatus are selected so as to eliminate a bottlenecking apparatus, such that a bottlenecking apparatus is operated with the minimum period of failure, or such that the bottlenecking apparatus is replaced with an apparatus yielding the highest throughput.

An algorithm concerning control of physical distribution according to the first embodiment will now be described.

FIGS. 3A and 3B show the results of certain simulations, in the form of a graph showing, in chronological order, the condition of processing load imposed on a certain apparatus (a bar graph) and the condition of in-process load imposed on the apparatus (a curve graph). FIG. 3A shows an example in which a lot is in process with high frequency and an individual lot is processed within a comparatively short period of time. FIG. 3B shows an example in which a lot is in process with low frequency and an individual lot is processed within a comparatively long period of time.

In connection with the graphs, requirements satisfying two of three conditions provided below during a specified period of time ($\Delta T$) are computed as requirements set by the user for each apparatus.

(1) a case where an in-process load factor exceeds an upper limit (100%);

(2) a case where an in-process load factor tends to increase; and (3) a case where the area of processing load factor exceeds a predetermined value.

A dispatch rule applied to a lot which is being processed by the apparatus for which the two requirements have already been computed is changed, and a simulation is performed again.

The thus-modified dispatch rule can be selected by means of one of the dispatch rules described in connection with (D1) and (D2).

In a case where a re-simulation yields a result better than that of a previous simulation (the proportion of on-time delivery or the total number of processing steps are taken as determination parameters), a set-up sequence is replaced. If a desired object cannot be attained, a re-simulation is performed as a second choice through use of one of the preset dispatch rules (D1) and (D2). The line manager should set beforehand whether selection of the first satisfactory requirements or selection of the optimal requirements from all requirements is to be performed through repetition of processing pertaining to the preset requirements.

By means of setting and modifying the parameters, the line manager can automatically set control of more efficient physical distribution with lapse of time.

A specified period of time $\Delta T$ shown in FIGS. 3A and 3B can be set in a continuous time period in accordance with the processing capability of the simulator 3. Further, the period of time $\Delta T$ can be set so that random sampling inspection can be performed or so that products can be monitored during only a set period of time.

The above-described logic can be applied to single-product mass production. However, when the logic is applied to a variable multi-product production line, particularly a line on which manufacture and development of products are performed simultaneously, there may arise a case where a simulation which has been performed in advance becomes useless because of incessantly-changing physical distribution parameters. As a result, in many cases, confusion arises in a production line, thus rendering production inefficient.

Figure 4:
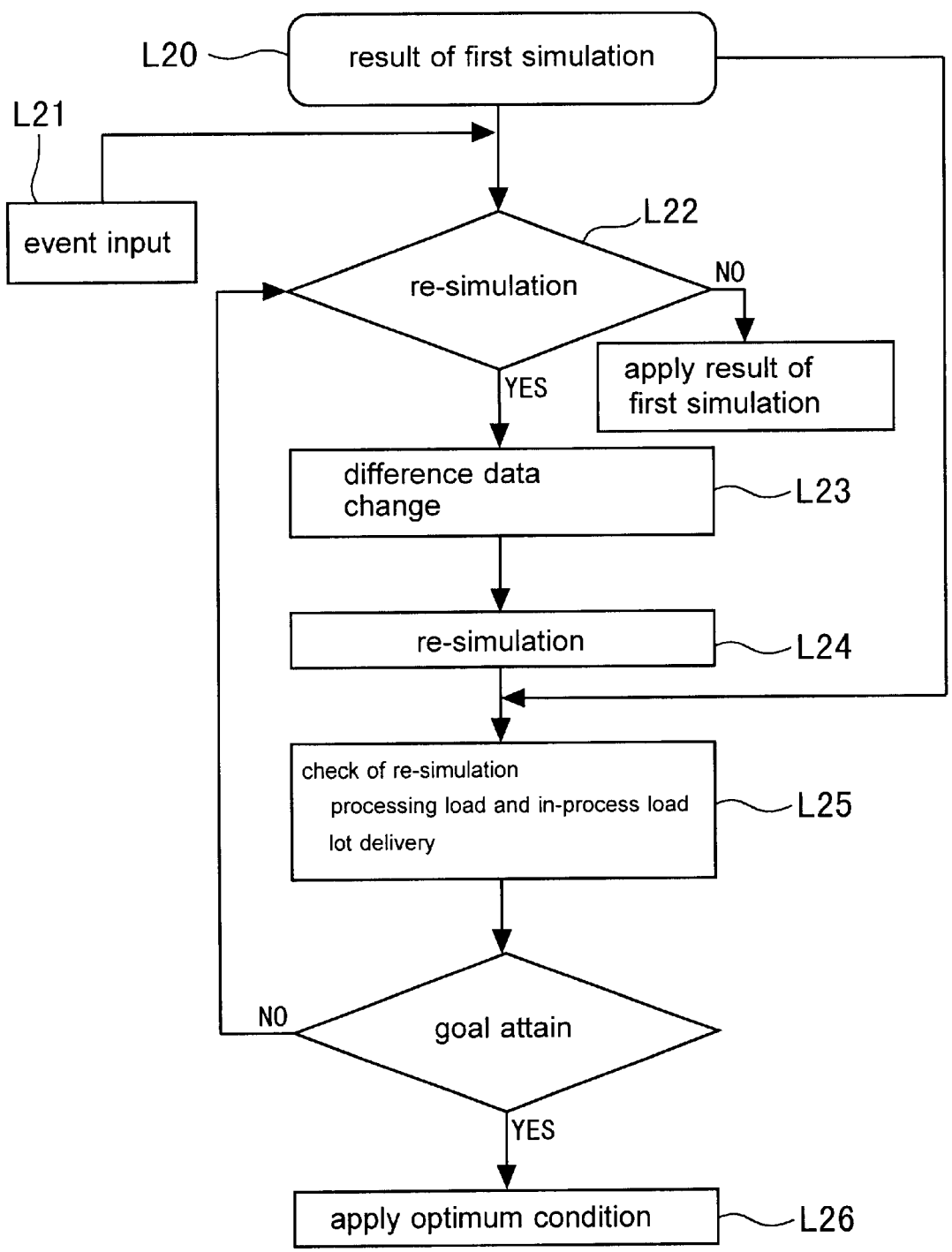
FIG. 4 shows an algorithm of a simulation for optimization.

In order to prevent occurrence of confusion, in the present embodiment, a simulation for optimization can be performed through use of the algorithm shown in FIG. 4.

Optimization following variations in physical-distribution factors is the key to solving the problem. Hence, according to the algorithm shown in FIG. 4, various types of data captured at the time of a first simulation are prepared in L20, and variations in physical-distribution parameters are captured in a timely manner for ensuring optimization following the variations. In L21, occurrence of an event is captured in a timely manner.

In L22, a re-simulation is performed by means of taking the event into consideration. The previous simulation result is compared with the thus-performed simulation in terms of a load imposed on an apparatus and the proportion of on-time delivery of a lot, thereby making a determination as to whether to change physical distribution. In order to immediately feed back the result of determination to the current physical distribution, immediate feedback is implemented in L23 by use of data pertaining to a difference between changes.

Difference data required for performing a re-simulation are primarily classified into two categories; that is, data pertaining to (the state of) an apparatus, and data pertaining to a lot (in an unfinished processing step).

Re-computation is performed on the basis of the state of an apparatus (i.e., operative/inoperative, or the number of lots being processed), whereby information about S1, S2, S3, and S4 is updated.

Lot data are updated by means of re-collecting unfinished processing steps during the time of a re-simulation; checking modifications made on lots, such as addition of a process, modification to a process, or deletion of a process, for each lot; and checking the current lot data against the previously-used lot data, whereby a difference between the lot data is taken as difference data.

Lot data change greatly in accordance with the capacity of a line, and it is conceivable that the speed of a simulation is decreased by lot data. In such a case, difference data are updated by the following method.

(R1) The parameter (17) (concerning an integrated processing time) of the process data is made specifiable. As a result, the period of a simulation is substantially shortened, thereby reducing the size of process data and increasing computation speed.

(R2) Only the parameter (9) (concerning an event flag) of the process data is updated, thereby enabling selection of choices, such as an increase in computation speed.

(R3) Data pertaining to the parameter (20) (concerning a change flag) of the process data are collected and replaced.

In a case where the result of re-simulation fails to satisfy predetermined requirements, a predetermined dispatch rule is changed, and in L24 another re-simulation is performed.

In L25, the result of re-simulation is checked. In a case where the result exceeds preset goals; that is, the load factor imposed on a processing apparatus, an in-process load factor imposed on processing apparatus, and the proportion of on-time delivery of a lot, in L26 the re-simulation is fed back as optimal requirements to actual physical control.

In the above embodiment, as an alternative, the production controller 2 may be replaced by a data processing apparatus connected on line to an off line management apparatus having a production management function. In this case, the data processing apparatus may be a part of the simulator 3 or a production controller.

Second Embodiment

A second embodiment of the present invention will now be described by reference to the corresponding drawings.

Figure 5:
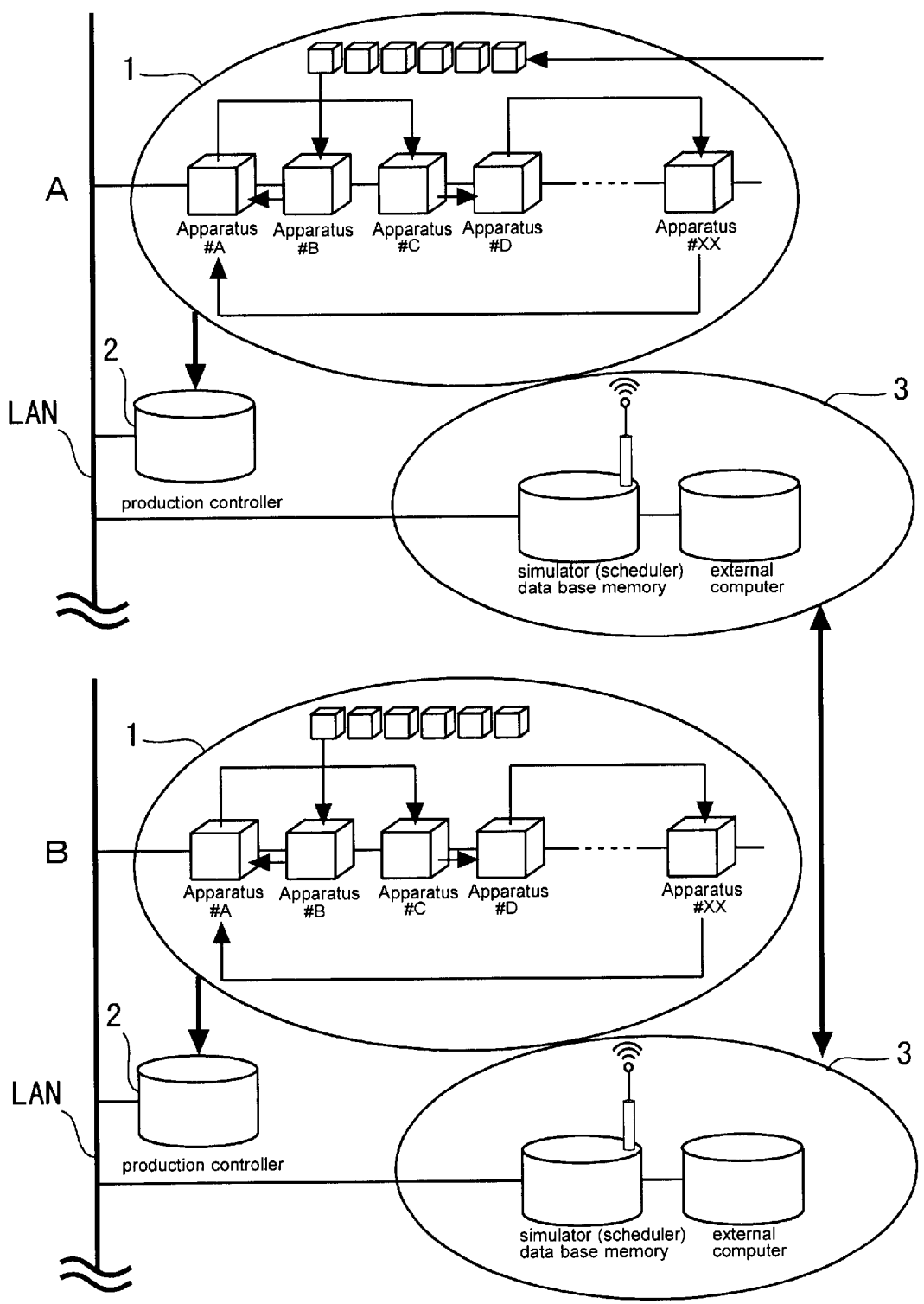
FIG. 5 is a chart showing the configuration of a production management system according to a second embodiment.
Figure 6:
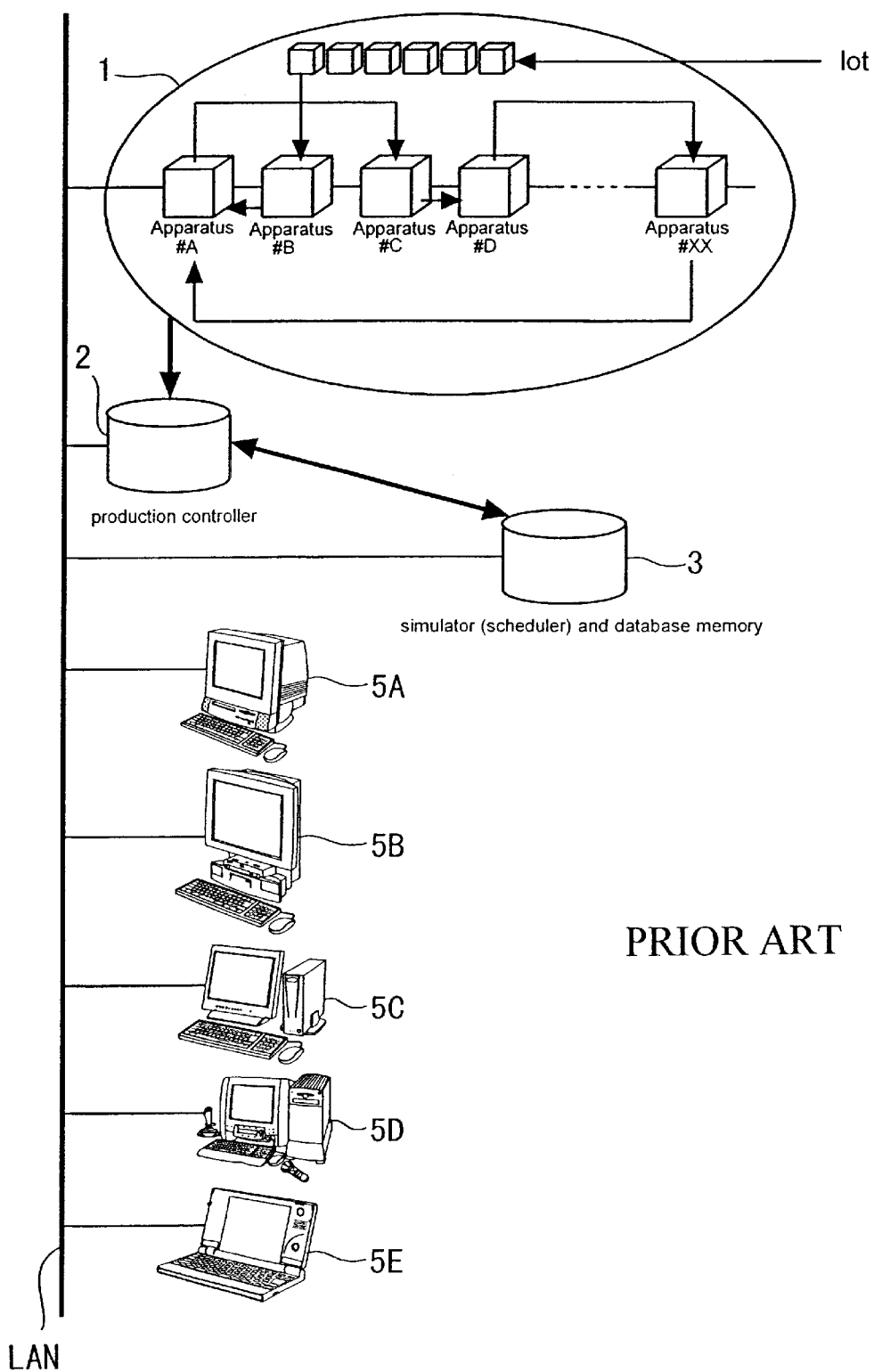
FIG. 6 is a chart showing an example of a conventional production management system.

FIG. 5 is a chart showing the configuration of a production management system according to the second embodiment. As illustrated, the second embodiment is directed toward a case where manufacture of products is performed by a plurality of production sites operating in concert, each production site comprising the production line 1, the production controller 2, and the simulator/external computer 3, which are shown in FIG. 1.

In FIG. 5, those elements which are identical with or correspond to the elements shown in FIG. 1 are assigned the same reference numerals, and repetition of their explanations is omitted. Reference symbols A and B denote different production sites. A plurality of pieces of manufacturing apparatus, production processes, and wafer sizes employed in the respective production sites are interchangeable.

In the event that an apparatus #XX installed in the production site A has caused failures, in a case where an urgent lot which is being processed by the apparatus #XX is desired to be completed, intended recovery data pertaining to the apparatus #XX stored in the simulator/external computer 3 installed in the production site A are ascertained automatically or by means of establishment of communication between production managers.

In a case where it is determined that a recovery time is longer than the sum total of the time required for transporting the lot from the production site A to the production site B, the time required for processing the lot at the production site B, and the time required for returning the lot from the production site B to the production site A and that a bottle necking apparatus does not appear in the production site B for the time being, a set-up operation is commenced by means of a routine based on close cooperation between the two production controllers 2 of the production sites A and B.

In the present embodiment, the production managers can ascertain whether or not lots which overlap each other in terms of processing operations are present in the production sites A and B, by means of communication of parameters, particularly time-series data pertaining to an in-process load factor of an apparatus, as well as by means of a real-time information release function.

Third Embodiment

The first embodiment shown in FIG. 1 has described an example in which specified parameters (e.g., a dispatch rule and the period of a simulation) and automatically-extracted parameters (a processing time, of single-wafer processing or batch processing, of each recipe and an apparatus path defined for each device or process) are extracted from the production controller 2. In the third embodiment, so long as data can be exchanged between the simulator 3 and the production line 1, data may be supplied from another terminal.

Fourth Embodiment

The first embodiment has described an example in which time-series track record data pertaining to a load factor of a processing apparatus and an in-process load factor of a processing apparatus in a simulation and an archival database (DB) pertaining to scheduled times for starting and terminating an event from outside are established in the simulator 3. In the fourth embodiment, the database may be established in another terminal, so long as the simulator 3 can exchange data with the terminal.

Fifth Embodiment

Although the first embodiment has described an example in which occurrence of an event is transmitted by means of wireless communication, in the fifth embodiment occurrence of an event may be transmitted from individual pieces of production apparatus installed along the production line 1 or the terminals 5A to 5E connected to the LAN. If the portable terminal 4 is provided with the function of receiving a simulation result and a personal itinerary management function (PIM), as well as the function of registering the time of completion of an event and transmitting data pertaining to registered modifications, the portable terminal 4 can obtain the function of leaving an instruction record therein and ascertaining the instruction record.

Further, the portable terminal 4 may be provided with the function of locally triggering the simulator 3 after transmission of an event and locally preserving the result of a triggering operation, the function of inspecting information about the result by means of transmitting the result to a line manager, and the function of causing an interrupt in an actual production schedule on the basis of the thus-inspected information.

Sixth Embodiment

The first embodiment has described an example in which a location for detecting/setting a trigger for causing a re-simulation is provided in the simulator 3. However, in the sixth embodiment the location may be provided in another terminal, so long as the simulator 3 can exchange data with the location.

Seventh Embodiment

The first embodiment has described an example in which a database is established in the simulator 3, wherein the function of checking the data used for performing a re-simulation (process data pertaining to a lot) against the data used for performing a previous simulation and details of a simulation (e.g., reasons for performing/re-performing a simulation, reasons for computation, or the like) are registered according to category. In the seventh embodiment, the database may be established in another terminal, so long as the simulator 3 can exchange data with the data base.

Eighth Embodiment

The first embodiment has described an example in which the production system has the function of converting the condition of entry of an event, the condition of performance of a simulation, and a computation result into HTML (HyperText Markup Language) and the Worldwide Web (www) server function. However, in the eighth embodiment these functions may be implemented individually in a terminal capable of establishing communication with the simulator 3.

Ninth Embodiment

The first embodiment has described an example in which the result of a simulation is distributed as setup information to production apparatus connected on line to a production line. In the ninth embodiment, in the case of a line which has not yet been constructed so as to perform complete factory automation or a line involving manual manufacturing operation, a similar working-effect can be yielded by means of causing the simulator 3 to output a production schedule.

Tenth Embodiment

FIG. 2 pertaining to the first embodiment illustrates an example of physical distribution which does not take in to consideration a transfer time. In the tenth embodiment, in a real situation, physical distribution taking into consideration a transfer time can be established, by means of adding the distance between pieces of apparatus (converted into a time parameter) to the unfinished process information used in a simulation.

FIG. 2 shows a major method of picking up a lot and an option rule. Needless to say, another rule may be applied.

Eleventh Embodiment

FIG. 2 shows an example in which a completed processing list, i.e., processing record, is handled as an internal document of the simulator 3. In the eleventh embodiment, in a case where computation of a load factor of each apparatus or preparation of a schedule of each apparatus is performed, such a task may be performed by another terminal capable of enabling transfer of data.

Twelfth Embodiment

FIG. 4 shows an example algorithm in which difference data are captured in the simulator 3 when a re-simulation is performed. In the twelfth embodiment, capturing of difference data may be performed by another terminal capable of establishing data communication between the simulator and the production controller.

Thirteenth Embodiment

The second embodiment shown in FIG. 5 has described an example in which manufacture of products is performed by means of cooperation between the two production sites A and B. In the thirteenth embodiment, cooperation may be established between three or more production sites. Although security of data exchanged between production sites has not been described, it goes without saying that data are protected by means of software and hardware through use of a technique used in connection with the Internet.

The effects and advantages of the present invention may be summarized as follows.

Since the present invention has been embodied in the foregoing manner, efficient physical distribution can be implemented in a development line in which there is introduced a development lot for which a production flow is not determined or in which interrupts are frequently caused by changing or reproduction of a process flow of an introduced lot, urgent tests, or inspection, by means of timely application of a change in physical distribution parameters to the result of simulation, to thereby dynamically changing a physical distribution rule (i.e., a dispatch rule).

Computation results, such as an availability factor, the total number of processing steps of a line, and the proportion of on-time delivery, are distributed in real time. Modifications and computation results are linked together, thereby establishing a database. As a result, retrieval of a physical distribution rule for leveling out lots concentrated at a certain bottle necking apparatus becomes possible. The present invention yields an advantage; that is, the longer the production management system is operated, the more easily an efficient physical distribution system can be established.

In the case of manufacture of products in cooperation with another production site and where lots processed in the respective production sites overlap each other in terms of processing operation, exchange of lots between production sites can be readily performed by means of real-time exchange of parameters between simulators.

The present invention provides a production management system as described above in detail. It is also recognized from the above description that the present invention also provides a method of managing a production system, or a method of manufacturing an electronic device such as a semiconductor device by managing a production line or facilities.

The method of production may be carried out by a production management system comprising a production controller connected online to a plurality of pieces of production apparatus, or a data processing apparatus connected on line to an offline management apparatus having a production management function and a simulator.

A simulation of physical distribution is conducted for a specified period of time through use of a simulation parameter, apparatus information, and process information, which are acquired from the production controller or the offline management apparatus. A re-simulation of physical distribution is performed while taking, as parameters for optimizing physical distribution, time-series data pertaining to the availability factor of each apparatus and the load factor of each apparatus obtained as a result of the previous simulation, as well as the start and termination times of an event which is to arise in the period of a simulation. Then, dynamically changed is a dispatch rule set for each apparatus or a group of pieces of apparatus having a same function, feeding back the change to control of real physical distribution.

In another aspect of the present invention, in the method, the re-simulation of physical distribution is performed automatically or at a predetermined timing while occurrence of an event is used as a trigger, and the result of the simulation is retained in the simulator or an external computer connected thereto and can be transmitted.

In another aspect, in the method, reporting of occurrence of the event is registered or changed while start and termination times or scheduled start and termination times are taken as parameters. The registered report is registered in the simulator or an external computer connected thereto. A re-simulation of physical distribution is performed automatically or at a predetermined timing after completion of registration of the report, and the result of the re-simulation is immediately transmitted from the simulator or from the external computer connected thereto.

Obviously many modifications and variations of the present invention are possible in the light of the above teachings. It is therefore to be understood that within the scope of the appended claims the invention may by practiced otherwise than as specifically described.

The entire disclosure of a Japanese Patent Application No. 2000-211908, filed on Jul. 12, 2000 including specification, claims, drawings and summary, on which Convention priority of the present application is based, are incorporated herein by reference in its entirety.

What is claimed is:

1. A production management system comprising:
at least one of a production controller connected online to a plurality of pieces of production apparatus and a data Processing apparatus connected online to an offline management apparatus having a production management function; and
a simulator,
wherein the simulator performs a simulation of physical distribution for a specified period of time through use of a simulation parameter, apparatus information, and process information, which are acquired from the production controller or the offline management apparatus: the simulator performs a re-simulation of physical distribution while taking, as parameters for optimizing physical distribution, time-series data pertaining to the availability factor of each apparatus and the load factor of each apparatus obtained as a result of the simulation, as well as the start and termination times of an event which is to arise in the period of the simulation;
wherein, the production controller dynamically changes a dispatch rule set for each apparatus or a group of pieces of apparatus having a same function, thus feeding back the change to control of real physical distribution, and
wherein the re-simulation of physical distribution is performed on the basis of a dispatch rule previously set for each apparatus or a group of apparatus having identical functions; and, in a case where data pertaining to a load factor and an in-process load factor of the apparatus or the group of apparatus obtained as a result of re-simulation do not satisfy predetermined requirements, the dispatch rule is changed to a predetermined dispatch rule, and a re-simulation is performed; and an initial value for the next re-simulation is selected on the basis of the result of the re-simulation.

2. The production management system according to claim 1, wherein a history of performance of a re-simulation, the result of computation, a history of allowance for feeding back the result of computation to control of actual physical distribution, a history of changing of a dispatch rule, and the result of matching between a result predicted during a predetermined period of simulation and an actual physical distribution parameter are registered in the simulator or the external computer connected thereto, according to category, thereby enabling quicker determination as to recurrence of an identical or similar event.

3. A production management system comprising:
at least one of a production controller connected online to a plurality of pieces of production apparatus and a data processing apparatus connected online to an offline management apparatus having a production management function; and
a simulator,
wherein the simulator performs a simulation of physical distribution for a specified period of time through use of a simulation parameter, apparatus information, and process information, which are acquired from the production controller or the offline management apparatus; the simulator performs a re-simulation of physical distribution while taking, as parameters for optimizing physical distribution, time-series data pertaining to the availability factor of each apparatus and the load factor of each apparatus obtained as a result of the simulation, as well as the start and termination times of an event which is to arise in the period of the simulation;
wherein, the production controller dynamically changes a dispatch rule set for each apparatus or a group of pieces of apparatus having a same function, thus feeding back the change to control of real physical distribution, and
wherein the system is used with a plurality of production sites, each site having a production controller connected online to a plurality of pieces of production apparatus, or a data processing apparatus connected online to an offline management apparatus having a production management function; and a simulator, in which manufacture of products is performed by means of cooperation between the production sites; and simulation parameters including the time-series data pertaining to an in-process load factor of apparatus are exchanged between the production controllers of the production sites and simulators or external computers connected thereto, and the parameters are distributed in real time.

4. A production management system comprising:
at least one of a production controller connected online to a plurality of pieces of production apparatus and a data processing apparatus connected online to an offline management apparatus having a production management function; and
a simulator,
wherein the simulator performs a simulation of physical distribution for a specified period of time through use of a simulation parameter, apparatus information, and process information, which are acquired from the production controller or the offline management apparatus; the simulator performs a re-simulation of physical distribution while taking, as parameters for optimizing physical distribution, time-series data pertaining to the availability factor of each apparatus and the load factor of each apparatus obtained as a result of the simulation, as well as the start and termination times of an event which is to arise in the period of the simulation;
wherein, the production controller dynamically changes a dispatch rule set for each apparatus or a group of pieces of apparatus having a same function, thus feeding back the change to control of real physical distribution, and
wherein events, including a real event, a reserved event, and a virtual event, are converted into a network language which does not depend on the platform of a computer, such as HTML (HyperText Markup Language) of XML (Extensible Markup Language), over an intranet/Internet in an input terminal or a computer which performs centralized control operation; and the converted language is formed into a database (an electronic file), and all the details of a re-simulation and changes in the result of re-simulation are distributed sequentially or in real time.

* * * * *